US007377358B2

(12) United States Patent
Sasaki et al.

(10) Patent No.: US 7,377,358 B2
(45) Date of Patent: May 27, 2008

(54) FRAME FOR SPEAKER DEVICE AND SPEAKER DEVICE

(75) Inventors: Hiromitsu Sasaki, Yamagata (JP); Yutaka Moriyama, Yamagata (JP)

(73) Assignees: Pioneer Corporation, Tokyo (JP); Tohoku Pioneer Corporation, Yamagata (JP)

( * ) Notice: Subject to any disclaimer, the term of this patent is extended or adjusted under 35 U.S.C. 154(b) by 160 days.

(21) Appl. No.: 11/355,980

(22) Filed: Feb. 17, 2006

(65) Prior Publication Data

US 2006/0237257 A1 Oct. 26, 2006

(30) Foreign Application Priority Data

Feb. 17, 2005 (JP) ............................ 2005-040035

(51) Int. Cl.

*H04R 7/16* (2006.01)
*H04R 1/02* (2006.01)
*H04R 1/16* (2006.01)
*H04R 9/04* (2006.01)
*G10K 13/00* (2006.01)
*H04B 1/03* (2006.01)
*H04R 5/02* (2006.01)

(52) U.S. Cl. ...................... 181/171; 181/150; 381/302; 381/86; 381/332; 381/389

(58) Field of Classification Search ................ 181/171, 181/150, 148, 199; 381/302, 86, 332, 386, 381/389

See application file for complete search history.

(56) References Cited

U.S. PATENT DOCUMENTS 1,967,223 A * 7/1934 Bostwick .................... 181/173
2,123,442 A * 7/1938 Stone ......................... 181/148
2,154,705 A * 4/1939 Schultz ....................... 381/392
3,201,529 A * 8/1965 Surh .......................... 381/186
3,892,289 A * 7/1975 Rollins ....................... 181/171
3,993,345 A * 11/1976 Croup ..................... 296/37.16
4,152,544 A * 5/1979 Sanpei et al. ............... 181/199
4,277,653 A * 7/1981 Pawelzick ................... 381/395
4,331,841 A * 5/1982 Castagna .................... 381/186
4,465,905 A * 8/1984 Nation ....................... 381/386
4,565,905 A * 1/1986 Nation ....................... 381/186

(Continued)

FOREIGN PATENT DOCUMENTS

DE 4126122 A1 * 2/1992

(Continued)

*Primary Examiner*—Edgardo San Martin
(74) *Attorney, Agent, or Firm*—Young & Thompson

(57) ABSTRACT

A speaker device includes a vibration system having a frame and a magnetic circuit. The frame has a magnetic circuit housing unit, an outer peripheral portion having an annular shape arranged on the outer side thereof, and multiple arm parts connecting the magnetic circuit housing unit and outer peripheral portion. Plural flat surfaces to which a cushion is attached are formed on an upper surface of the outer peripheral portion and a lower surface thereof. Each of the flat surfaces on the upper surface of the outer peripheral portion and each of the flat surfaces on the lower surfaces are connected by a corresponding connecting part. The plural flat surfaces to which the cushion member is attached are formed between the outer peripheral wall of the outer peripheral portion and the inner peripheral wall thereof, rather than the outer side of the outer peripheral wall of the outer peripheral portion.

9 Claims, 9 Drawing Sheets

U.S. PATENT DOCUMENTS

| | | | | | |
|---|---|---|---|---|---|
| 4,572,326 | A * | 2/1986 | Hutchins | 181/150 |
| 4,797,935 | A * | 1/1989 | Tanaka | 381/392 |
| 4,847,907 | A * | 7/1989 | Ando | 381/86 |
| 4,923,032 | A * | 5/1990 | Nuernberger | 181/150 |
| 5,115,884 | A * | 5/1992 | Falco | 181/156 |
| 5,133,018 | A * | 7/1992 | Miyazaki | 381/395 |
| 5,532,437 | A * | 7/1996 | Simplicean et al. | 181/150 |
| 5,703,335 | A * | 12/1997 | Deutsch | 181/150 |
| 5,736,689 | A * | 4/1998 | Van Hout et al. | 181/141 |
| 5,802,191 | A * | 9/1998 | Guenther | 381/386 |
| 5,867,583 | A * | 2/1999 | Hazelwood et al. | 381/395 |
| 6,386,315 | B1 * | 5/2002 | Roy et al. | 181/150 |
| 6,481,173 | B1 * | 11/2002 | Roy et al. | 52/506.07 |
| 6,504,939 | B1 * | 1/2003 | Fukuda | 381/386 |
| 6,505,705 | B1 * | 1/2003 | Espiritu et al. | 181/150 |
| 6,526,150 | B2 * | 2/2003 | Kelly et al. | 381/353 |
| 6,577,741 | B1 * | 6/2003 | Basore | 381/386 |
| 6,578,658 | B2 * | 6/2003 | Jones et al. | 181/141 |
| 6,651,772 | B1 * | 11/2003 | Esser | 181/171 |
| 6,675,930 | B2 * | 1/2004 | Sugiyama et al. | 181/148 |
| 6,904,157 | B2 * | 6/2005 | Shima | 381/388 |
| 6,987,860 | B2 * | 1/2006 | Kurihara et al. | 381/386 |
| 6,990,212 | B2 * | 1/2006 | Kambe | 381/386 |
| 7,062,054 | B2 * | 6/2006 | Nishikawa et al. | 381/182 |
| 7,239,715 | B2 * | 7/2007 | Maekawa et al. | 381/389 |
| 2003/0136605 | A1 * | 7/2003 | Chuang | 181/148 |
| 2004/0037445 | A1 * | 2/2004 | Kirihara et al. | 381/389 |
| 2004/0062407 | A1 * | 4/2004 | Ziegler et al. | 381/189 |
| 2004/0264729 | A1 * | 12/2004 | Ito et al. | 381/389 |
| 2005/0175211 | A1 * | 8/2005 | Suzuki | 381/395 |

FOREIGN PATENT DOCUMENTS

| | | | |
|---|---|---|---|
| JP | 59219098 | A * | 12/1984 |
| JP | 60236399 | A * | 11/1985 |
| JP | 63073799 | A * | 4/1988 |
| JP | 8-79866 | | 3/1996 |
| JP | 2001-169374 | | 6/2001 |
| JP | 2003-153359 | | 5/2003 |
| JP | 2004-23483 | | 1/2004 |

* cited by examiner

FRAME FOR SPEAKER DEVICE AND SPEAKER DEVICE

TECHNICAL FIELD

The present invention relates to a configuration of a frame for a speaker device.

BACKGROUND ART

Conventionally, there is known a speaker device including a vibrating system having a frame and a diaphragm, and a magnetic circuit system having a yoke, a magnet and a plate. Such a speaker device is preferably used as an on-vehicle speaker device.

In such a speaker device, a part of an outer peripheral portion of the frame is formed into a flange shape. A cushion member having a cushion property is attached to the flange part. Thus, the frame is mounted on a mounting base via the cushion member attached to the flange part so that the speaker device is mounted on a mounting board (mounting base) of an inner panel of a door of the vehicle. Thereby, the speaker device can be mounted on the mounting base.

By the configuration, it can be advantageously prevented that vibration occurring at the time of driving of the speaker device is transmitted to the mounting base. An example of the speaker device having such a configuration is disclosed in Japanese Patent Application Laid-open under No. 2001-169374. In addition, examples of the speaker device of this kind are disclosed in Japanese Patent Applications Laid-open under No. 2004-23483, No. 2003-153359 and No. 8-79866, for example.

However, in the above speaker devices, since the flange part to which the cushion member is attached is formed at a part of the outer peripheral portion of the frame, an outer diameter of the frame problematically becomes large by the amount.

DISCLOSURE OF THE INVENTION

The present invention has been achieved in order to solve the above problem. It is an object of this invention to provide a frame for a speaker device and a speaker device including the frame capable of ensuring, at an outer peripheral portion of the frame, a portion to which a cushion member is attached without enlarging an outer diameter of the frame.

According to one aspect of the present invention, there is provided a frame for a speaker device including an outer peripheral portion formed into an annular shape and having an outer peripheral wall, wherein the outer peripheral portion has one flat surface which is formed on one surface of the outer peripheral portion and to which a cushion member is attached, an additional flat surface which is formed on an additional surface of the outer peripheral portion and to which a cushion member is attached, and a connecting part which connects one end of the one flat surface and one end of the additional flat surface, and wherein the one flat surface and the additional flat surface are formed on an inner side with respect to the outer peripheral wall of the outer peripheral portion.

The above frame for the speaker device is formed into the annular shape and includes the outer peripheral portion having the outer peripheral wall. The outer peripheral portion is formed on the one surface of the outer peripheral portion, and the cushion member is attached thereto. In addition, the outer peripheral portion includes the one flat surface formed on the one surface of the outer peripheral portion and having the flatness, which the cushion member is attached to, the additional flat surface formed on the additional surface of the outer peripheral portion and having the flatness, which the cushion member is attached to, and the connecting part which connects the one end of the one flat surface and the one end of the additional flat surface. The one flat surface and the additional flat surface are formed on the inner side with respect to the outer peripheral wall of the outer peripheral portion. Thereby, the cushion member attachment surface can be ensured without enlarging the outer diameter of the frame for the speaker device.

Namely, on the frame for the speaker device (hereinafter simply referred to as "comparative example") having a manner of increasing the cushion member attachment surface by attaching the cushion member to the flange part provided on the outer peripheral wall of the outer peripheral portion of the frame, the outer diameter of the frame becomes large by the amount of the provided flange part. Meanwhile, on the above frame for the speaker device, the one flat surface and the additional flat surface to which the cushion member is attached are formed on the inner side with respect to the outer peripheral wall of the outer peripheral portion. In a preferred example, the outer peripheral portion may have an inner peripheral wall on an inner side of the connecting part, and the one flat surface and the additional flat surface may be formed between the inner peripheral wall and the outer peripheral wall. Thereby, a cushion member attachment surface can be ensured without enlarging the outer diameter of the frame for the speaker device.

In a manner of the above frame for the speaker device, the one surface of the outer peripheral portion may correspond to an upper surface of the outer peripheral portion, and the additional surface of the outer peripheral portion may correspond to a lower surface of the outer peripheral portion. The outer peripheral portion may include an additional connecting part connecting another end of the one flat surface and extending in a substantially same direction as the connecting part. The additional connecting part may correspond to the outer peripheral wall of the outer peripheral portion, and a lower end of the additional connecting part may become flush with the additional flat surface.

In this manner, the one surface of the outer peripheral portion corresponds to the upper surface of the outer peripheral portion, and the additional surface of the outer peripheral portion corresponds to the lower surface of the outer peripheral portion. The outer peripheral portion connects the other end of the one flat surface, and it has the additional connecting part extending in the substantially same direction as the connecting part. In addition, the additional connecting part corresponds to the outer peripheral wall of the outer peripheral portion, and the lower end of the additional connecting part becomes flush with the additional flat surface. Namely, on the additional surface (lower surface) of the outer peripheral wall, the lower end of the additional connecting part flush with the additional flat surface is formed in addition to the additional flat surface having the flatness. Thereby, the cushion member attachment surface can be increased on the additional surface (lower surface) of the outer peripheral portion by the amount without enlarging the outer diameter of the frame for the speaker device.

In another manner, the above frame for the speaker device may further include an end surface which planarly overlaps with a part of the additional flat surface, which is arranged on an inner side of the one flat surface and on a surface flush with the one flat surface, and which has flatness, and an annular projecting part upwardly projecting maybe formed on the end surface.

In this manner, the frame for the speaker device includes the end surface which planarly overlaps with the part of the additional flat surface, which is arranged on the inner surface of the one flat surface and on the surface flush with the one flat surface and which has the flatness. Namely, in addition to the one flat surface having the flatness, the end surface flush with the one flat surface is formed on the one surface (upper surface) of the outer peripheral portion. Thereby, the cushion member attachment surface can be increased on the one surface (upper surface) of the outer peripheral portion by the amount without enlarging the outer diameter of the frame for the speaker device. In addition, the annular projecting part upwardly projecting is formed on the end surface. Thereby, when the cushion member is attached to the one flat surface and the one end surface, the cushion member can be positioned at an appropriate position on the one surface (upper surface) of the outer peripheral portion.

In still another manner of the above frame for the speaker device, the outer peripheral portion may have a cushion member attachment surface to which a cushion member is attached at a position corresponding to a mounting board and at a position on an inner side with respect to an inner peripheral wall of the outer peripheral portion, when a speaker device having the outer peripheral portion is mounted on the mounting board. Then, the cushion member may be attached onto the cushion member attachment surface. Thereby, on the frame for the speaker device, the cushion member attachment surface can be increased, and the outer diameter of the frame can be diminished as compared with the above comparative example.

In still another aspect, the above frame for the speaker device may further include a magnetic circuit housing unit which is arranged on an inner side of the outer peripheral portion and houses a magnetic circuit; and plural arm parts which connect the magnetic circuit housing unit and the inner peripheral wall of the outer peripheral portion, and the cushion member attachment surface may be formed on the additional surface of the outer peripheral portion and between the inner peripheral wall of the outer peripheral portion and the plural arm parts, and it may become flush with the additional flat surface.

In this manner, the frame for the speaker device is arranged on the inner side of the outer peripheral portion, and it includes the magnetic circuit housing unit housing the magnetic circuit and the plural arm parts connecting the magnetic circuit housing unit and the inner peripheral wall of the outer peripheral portion. The cushion member attachment surface is formed on the additional surface (lower surface) of the outer peripheral portion and between the inner peripheral wall of the outer peripheral portion and the plural arm parts, and it becomes flush with the additional flat surface. In a preferred example, the cushion member attachment surface may be formed into a paddle-shaped or triangle-shaped plane shape when planarly observed. Thereby, the cushion member attachment surface can be further increased on the additional surface (lower surface) of the outer peripheral portion without enlarging the outer diameter of the frame for the speaker device.

According to another aspect of the present invention, there is provided a speaker device including a frame having an outer peripheral portion formed into an annular shape and including an outer peripheral wall, wherein the outer peripheral portion has one flat surface which is formed on one surface of the outer peripheral portion and to which a cushion member is attached, an additional flat surface which is formed on an additional surface of the outer peripheral portion and to which a cushion member is attached, and a connecting part which connects one end of the one flat surface and one end of the additional flat surface, and wherein the one flat surface and the additional flat surface are formed on an inner side with respect to the outer peripheral wall of the outer peripheral portion. Thereby, when the speaker device is mounted on the mounting base, since a contact area between the cushion member attached to the frame and the mounting base becomes large, the vibration occurring at the time of driving of the speaker device is hardly transmitted to the mounting base.

BEST MODE FOR CARRYING OUT THE INVENTION

The preferred embodiments of the present invention will now be described below with reference to the attached drawings. In this embodiment, the attachment surface to which the cushion member is attached is ensured on the upper surface and the lower surface of the outer peripheral portion of the frame without enlarging the outer diameter of the frame for the speaker device.

[Configuration of Speaker Device]

First, a description will be given of a configuration of a speaker device 100 according to an embodiment of the present invention with reference to FIG. 1 to FIG. 5.

Figure 1:
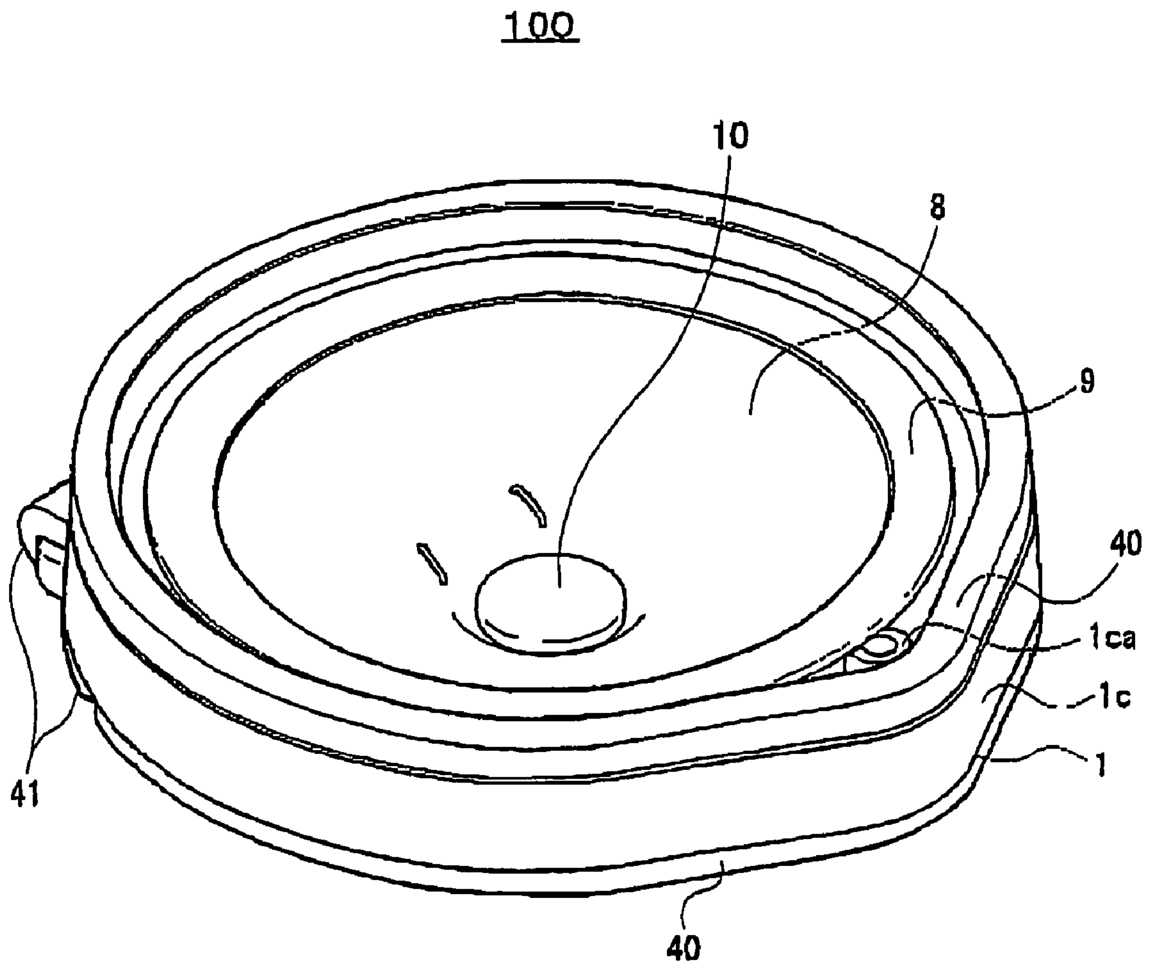
FIG. 1 shows a perspective view of a speaker device according to an embodiment of the present invention when observed from a sound output side.
Figure 2:
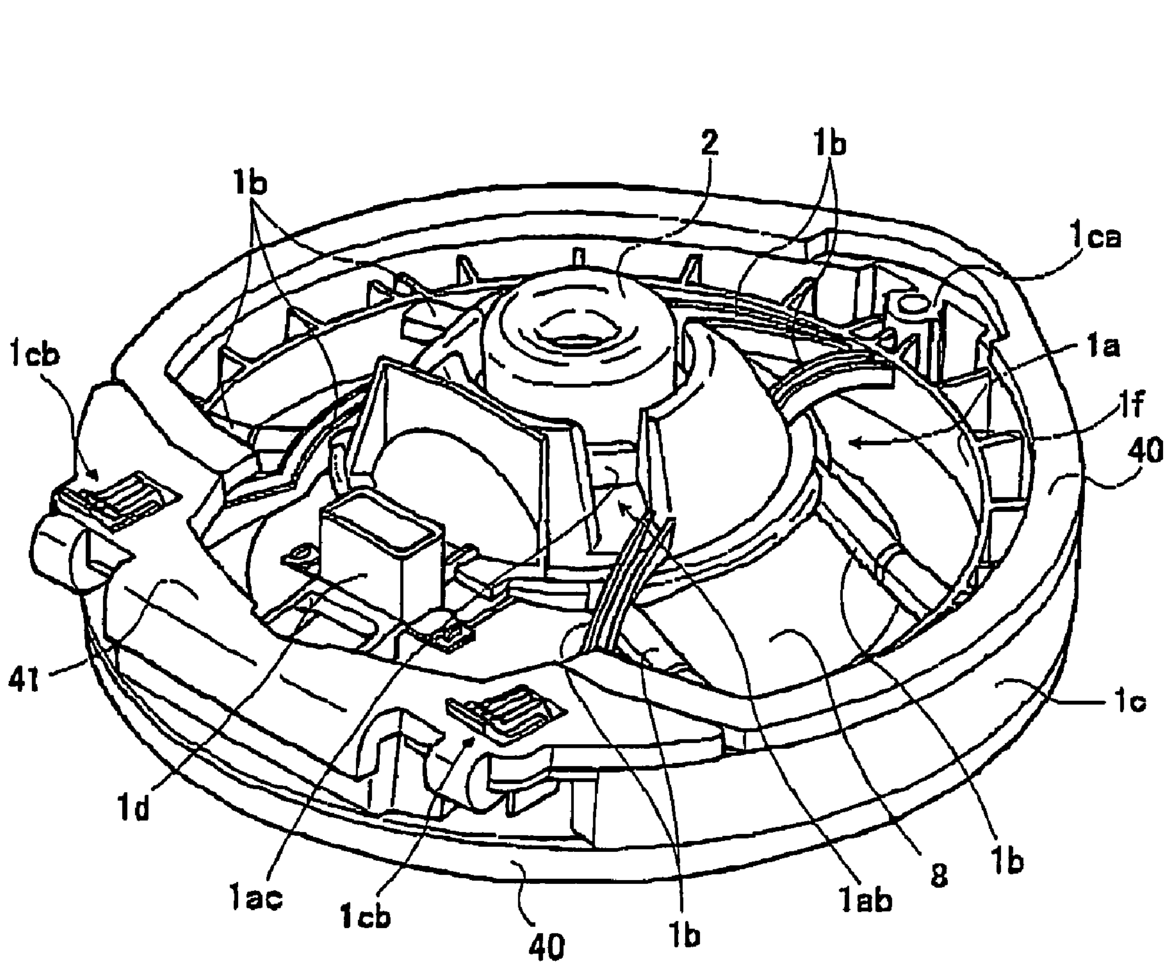
FIG. 2 shows a perspective view of the speaker device according to the embodiment when observed from a direction opposite to the sound output side.
Figure 3:
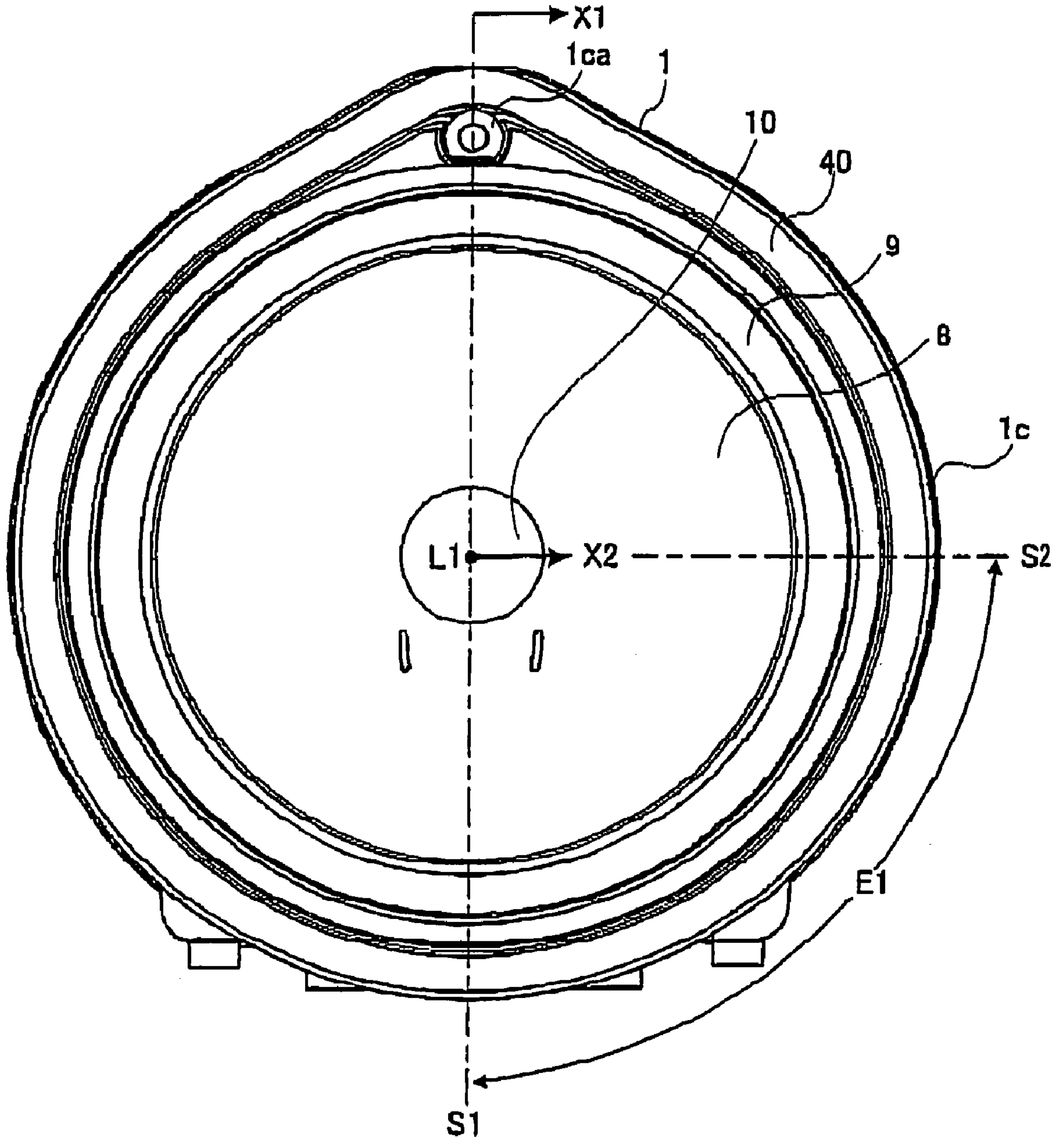
FIG. 3 shows a front view of the speaker device according to the embodiment.
Figure 4:
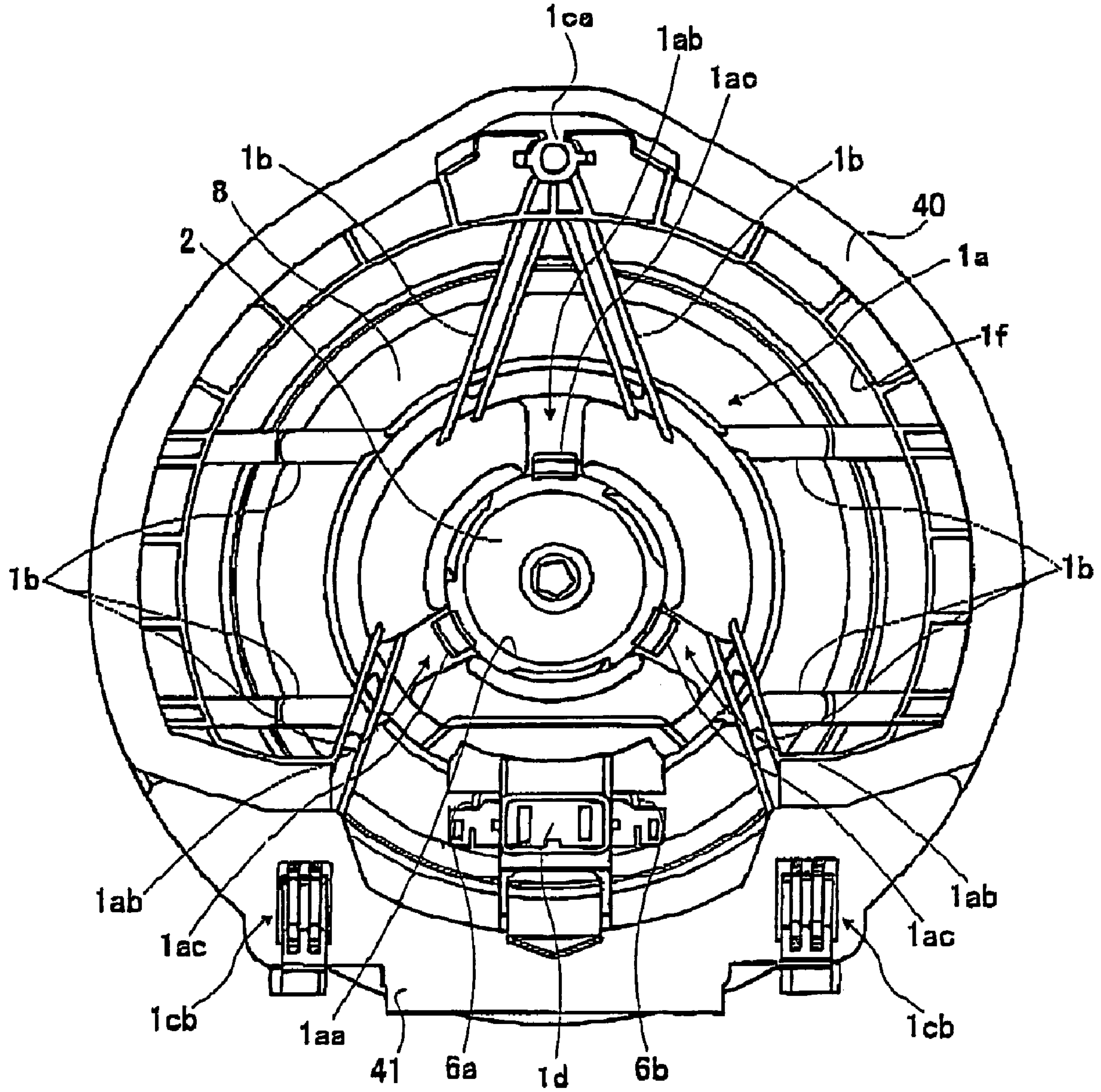
FIG. 4 shows a rear view of the speaker device according to the embodiment.
Figure 5:
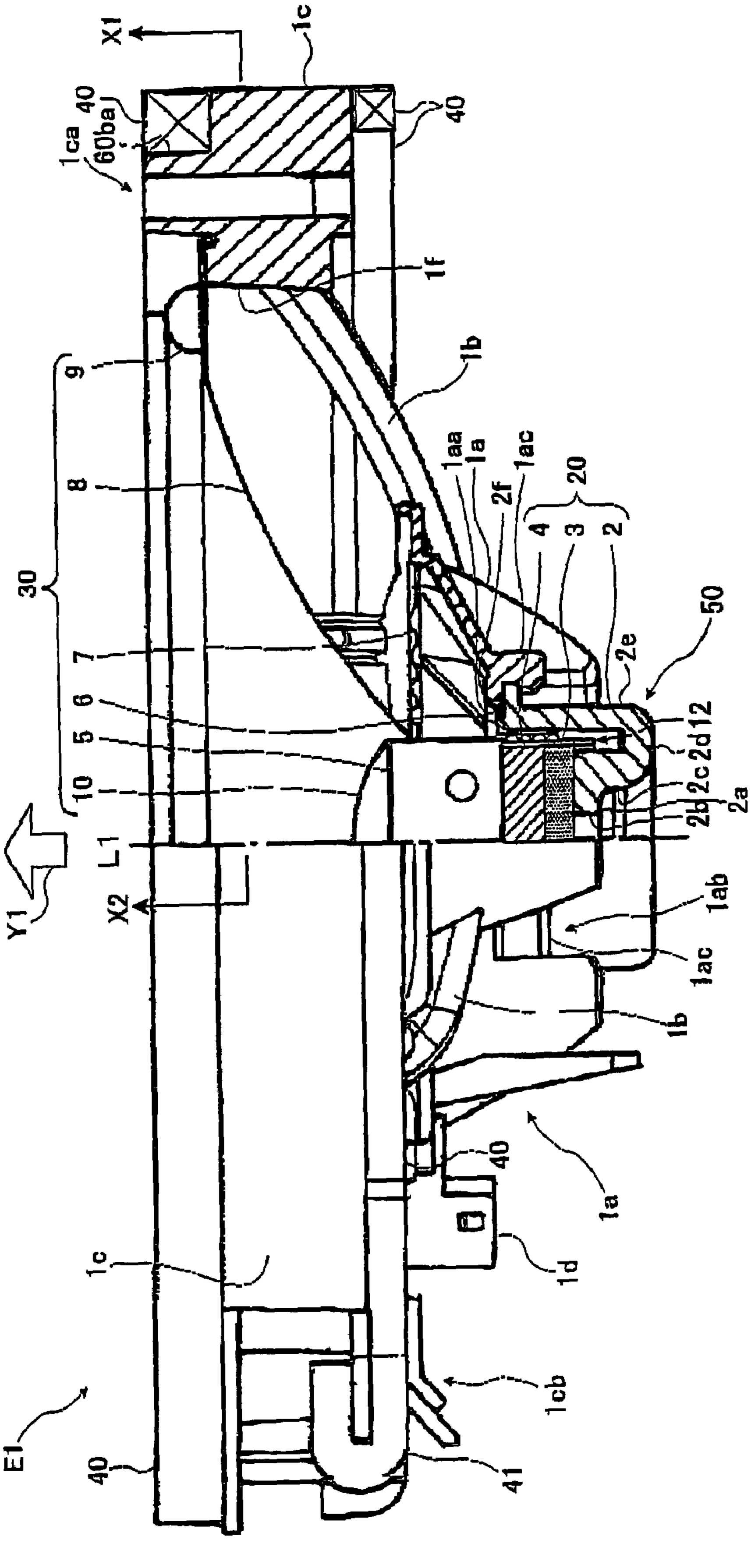
FIG. 5 shows an one-side cross-sectional view and an one-side side view of the speaker device according to the embodiment.

FIG. 1 shows a perspective view of the speaker device 100 according to an embodiment of the present invention in a case that it is observed from its sound output side. FIG. 2 shows a perspective view of the speaker device 100 in a case that it is observed from a side opposite to the sound output side, i.e., from a rear side. FIG. 3 shows a front view of the speaker device 100 in the case that it is observed from the sound output side. FIG. 4 shows a rear view of the speaker device 100 in the case that it is observed from the side opposite to the sound output side, i.e., from the rear side. FIG. 5 shows a cross-sectional view of the speaker device 100 on the right side of the drawing with respect to a central axis L1 of the speaker device 100 (or a frame 1) and a side view of the speaker device 100 on the left side of the drawing with respect to the central axis L1, respectively. In addition, the cross-sectional view shown on the right side of FIG. 5 is a cross-sectional view taken along the cutting-plane line X1-X2 of the speaker device 100 shown in FIG. 3. The side view shown on the left side of FIG. 5 corresponds to a side surface portion E1 of the speaker device 100 between a plane surface S1 passing through the central axis L1 of the speaker device 100 and a plane surface S2 passing through the central axis L1 and perpendicular to the plane surface S1 in FIG. 3.

The speaker device 100 according to this embodiment can be preferably used as an on-vehicle speaker device. The speaker device 100 is configured by mounting a speaker unit 50 onto the frame 1.

The speaker unit 50 includes a magnetic circuit system 20 having a yoke 2, a magnet 3 and a plate 4, and a vibrating system 30 having a voice coil bobbin 5, a voice coil 6, a damper 7, a diaphragm 8, an edge 9 and a cap 10.

First, each component of the magnetic circuit system 20 will be explained.

The magnetic circuit system 20 is configured as an internal magnet type magnetic circuit.

The yoke 2 is formed into a substantial pot shape. The yoke 2 has a first flat part 2*a* for supporting the disc-shape magnet 3, an opening 2*b* formed at a substantial center of the first flat part 2*a*, a first cylindrical part 2*c* connected to an outer peripheral portion of the first flat part 2*a*, a second flat part 2*d* connected to a lower end portion of the first cylindrical part 2*c*, a second cylindrical part 2*e* connected to an outer peripheral portion of the second flat part 2*d* and a flange part 2*f* connected to an upper end portion of the second cylindrical part 2*e* and outwardly extending from the upper end portion. Each of the components is integrally formed.

An upper surface of the first flat part 2*a* has flatness. The opening 2*b* has a function of radiating a heat generated in the magnetic circuit system 20 to the outside. The first cylindrical part 2*c* is formed into a cylindrical shape. In FIG. 5, by forming the first cylindrical part 2*c* to have a predetermined length in the direction of an arrow Y1, a relative positional relation of components of the vibrating system 30 with respect to the magnet 3 and the plate 4 can be adjusted. A lower surface of the second flat part 2*d* has flatness. The second flat part 2*d* has a function of forming a constant gap between the first cylindrical part 2*c* and the second cylindrical part 2*e*. The second cylindrical part 2*e* is formed into a cylindrical shape and is provided on the outer side of the first cylindrical part 2*c*. The second cylindrical part 2*e* has a function of forming a magnetic gap 12 between an inner peripheral wall of the second cylindrical part 2*e* and each of the outer peripheral walls of the magnet 3 and the plate 4. The flange part 2*f* is fixed to a magnetic circuit housing unit 1*a* being a component of the frame 1. By mounting the flange part 2*f* onto the magnetic circuit housing unit 1*a*, the magnetic circuit system 20 can be housed into the magnetic circuit housing unit 1*a*.

The magnet 3 is formed into a disc shape and is mounted onto the first flat part 2*a* of the yoke 2. On the magnet 3, the disc-shape plate 4 having the substantially same diameter as the magnet 3 is mounted.

In the magnetic circuit system 20 having such a configuration, the magnet 3 and the plate 4 configure the magnetic circuit, and magnetic flux of the magnet 3 is concentrated on the magnetic gap 12 formed between the outer peripheral wall of the plate 4 and the inner peripheral wall of the second cylindrical part 2*e*.

Next, each component of the vibrating system 30 will be explained.

The voice coil bobbin 5 is formed into a substantially cylindrical shape. The voice coil 6 which will be explained later is wound around the vicinity of the lower end portion of the outer peripheral wall of the voice coil bobbin 5. The vicinity of the lower end portion of the inner peripheral wall of the voice coil bobbin 5 is opposite to each of the outer peripheral walls of the magnet 3 and the plate 4 with constant spaces therebetween. Meanwhile, the vicinity of the lower end portion of the outer peripheral wall of the voice coil bobbin 5 is opposite to the vicinity of the upper end portion of the inner peripheral wall of the second cylindrical part 2*e* being the component of the yoke 2 with a constant space therebetween. A gap (magnetic gap 12) is formed between the inner peripheral wall of the second cylindrical part 2*e* and the outer peripheral wall of the plate 4.

The voice coil 6 has one wiring, which includes a plus lead wire 6*a* and a minus lead wire 6*b* as shown in FIG. 4. The plus lead wire 6*a* is an input wiring for an L (or R)-channel signal, and the minus leadwire 6*b* is an input wiring for a ground (GND: ground) signal. The lead wires 6*a* and 6*b* are electrically connected to a terminal 1*d* provided on the frame 1. In addition, the terminal 1*d* is electrically connected to a wiring on an output side of an amplifier (not shown). Thereby, the signal and the power of one channel are inputted to the voice coil 6 from the amplifier side via the terminal 1*d* and the lead wires 6*a* and 6*b*.

The damper 7 is formed into an annular shape and has an elastic part on which corrugations are concentrically formed. An inner peripheral edge portion of the damper 7 is mounted onto the vicinity of the upper end portion of the outer peripheral wall of the voice coil bobbin 5. Meanwhile, an outer peripheral edge portion of the damper 7 is mounted onto the outer peripheral portion of the magnetic circuit housing unit 1*a*.

Various kinds of materials such as paper, high polymer and metal can be applied to the diaphragm 8 in accordance with the various use purposes. The diaphragm 8 is formed into a cone shape. An inner peripheral edge portion of the diaphragm 8 is mounted onto the vicinity of the upper end portion of the outer peripheral wall of the voice coil bobbin 5 and onto the upper side of the damper 7. Meanwhile, the outer peripheral edge portion of the diaphragm 8 is mounted onto the inner peripheral edge portion of the annular edge 9. The outer peripheral edge portion of the edge 9 is mounted onto an outer peripheral portion 1*c* of the frame 1. In this example, the diaphragm 8 and the edge 9 are independently formed. However, this invention is not limited to this. Namely, the diaphragm 8 and the edge 9 may be integrally formed.

The cap 10 is formed into a substantial dome shape and is mounted onto the outer peripheral wall of the voice coil bobbin 5 in a manner to cover the upper surface of the voice coil bobbin 5. Thereby, it can be prevented that dust and foreign matter enter the inner side of the speaker unit 50.

The frame 1 is formed with various kinds of materials such as a metal and a resin. For the purpose of lightening the speaker device 100, the frame 1 is preferably formed with a resin material. The frame 1 mainly includes the magnetic circuit housing unit 1*a*, the outer peripheral portion 1*c* arranged on the outer side and the upper side of the magnetic circuit housing unit 1*a*, plural arm parts 1*b* connecting the magnetic circuit housing unit 1*a* and the outer peripheral portion 1c, and the terminal 1d provided in the vicinity of the outer peripheral portion of the magnetic circuit housing unit 1a. Each of the components is integrally formed. In addition, on the frame 1, an opening if is formed between the magnetic circuit housing unit 1a and the outer peripheral portion 1c.

The magnetic circuit housing unit 1a is formed into a substantial bowl shape and has an opening 1aa, cut-out parts 1ab and plural fixing parts 1ac. The diameter of the opening 1aa is substantially same as an outside diameter of the second cylindrical part 2e of the yoke 2. When the direction of the central axis L1 of the speaker device 100 is prescribed as the vertical direction in FIG. 5, the opening 1aa is formed at a position corresponding to the substantial center of the vertical direction of the magnetic circuit housing unit 1a. Each of the cut-out parts 1ab is formed by removing a part of the outer peripheral wall of the magnetic circuit housing unit 1a, and it is formed in the vicinity of the outer peripheral wall thereof with proper spaces therebetween. Each of the fixing parts 1ac is formed in the vicinity of the opening 1aa and at a position corresponding to the cut-out part 1ab. In addition, each of the fixing parts 1ac is formed along the circumferential direction of the opening 1aa with proper spaces therebetween.

One end of each arm part 1b is mounted onto the outer peripheral wall of the magnetic circuit housing unit 1a, and the other end thereof is attached to the inner peripheral wall of the outer peripheral portion 1c.

The outer peripheral portion 1c is formed into a substantially annular shape, and is provided on the outer side of the magnetic circuit housing unit 1a and the plural arm parts 1b. The outer peripheral portion of the edge 9 and cushion members 40 and 41 are mounted onto the outer peripheral portion 1c. The outer peripheral portion 1c has mounting parts 1ca and 1cb for mounting the speaker device 100 onto the mounting base such as an inner panel of the vehicle door, for example.

The mounting part 1ca is an inserting hole into which a bolt is inserted, and is provided at the position opposite to the terminal 1d at the outer peripheral portion c. The mounting parts 1cb are formed into a claw shape, and they are provided at the position opposite to the mounting part 1ca on the lower surface side of the outer peripheral portion 1c and in the vicinity of the terminal 1d. In addition, the one mounting part 1cb and the other mounting part 1cb are provided on the lower surface side of the outer peripheral portion 1c with a constant space therebetween.

To the upper surface of the outer peripheral portion 1c and a part of the lower surface of the outer peripheral portion 1c, a cushion member 40 having a cushion property and formed into a stick shape are attached in a state deformed into a substantial circle shape. As the cushion member 40, a member having an elastic property such as sponge and urethane is preferable, for example. In addition, to the other part of the lower surface of the outer peripheral portion 1c on the side of the plural mounting parts 1cb, a cushion member 41 formed with the same member as the cushion member 40 and formed into a shape shown in FIG. 5 is attached. Onto one surface of each of the cushion members 40 and 41, a seal having an adhesive property is printed or an adhesive is applied.

The above-mentioned speaker unit 50 is mounted onto the frame 1 in a manner which will be explained below. In FIG. 5, the voice coil bobbin 5 and the cap 10 being the components of the vibrating system 30 are inserted into the opening 1aa of the magnetic circuit housing unit 1a from the direction of the arrow Y1, and the upper end portion of the voice coil bobbin 5 and the cap 10 are disposed at the upper portion of the surface on the sound output side of the diaphragm 8. In this state, the flange part 2f being the component of the yoke 2 is fixed to the plural fixing parts 1ac provided in the magnetic circuit housing unit 1a. In this manner, the speaker unit 50 is mounted onto an appropriate position of the frame 1, and the speaker device 100 is configured.

In the speaker device 100 having the above-mentioned configuration, the signal and power outputted from the amplifier are inputted to the voice coil 6 via the terminal 1d, and the lead wires 6a and 6b of the voice coil 6. Thereby, a driving force occurs to the voice coil 6 in the magnetic gap 12, which vibrates the diaphragm 8 in the direction of the central axis L1 of the speaker device 100 in FIG. 5. In this manner, the speaker device 100 emits an acoustic wave in the direction of the arrow Y1 shown in FIG. 5.

(Configuration of Frame)

Next, a description will be given of the configuration of the frame 1 characterizing the present invention, with reference to FIG. 6 to FIG. 9. An embodiment according to the present invention is characterized by the configuration of the outer peripheral portion 1c of the frame 1 onto which the cushion members 40 and 41 are attached. Therefore, this point will be mainly explained below.

Figure 6:
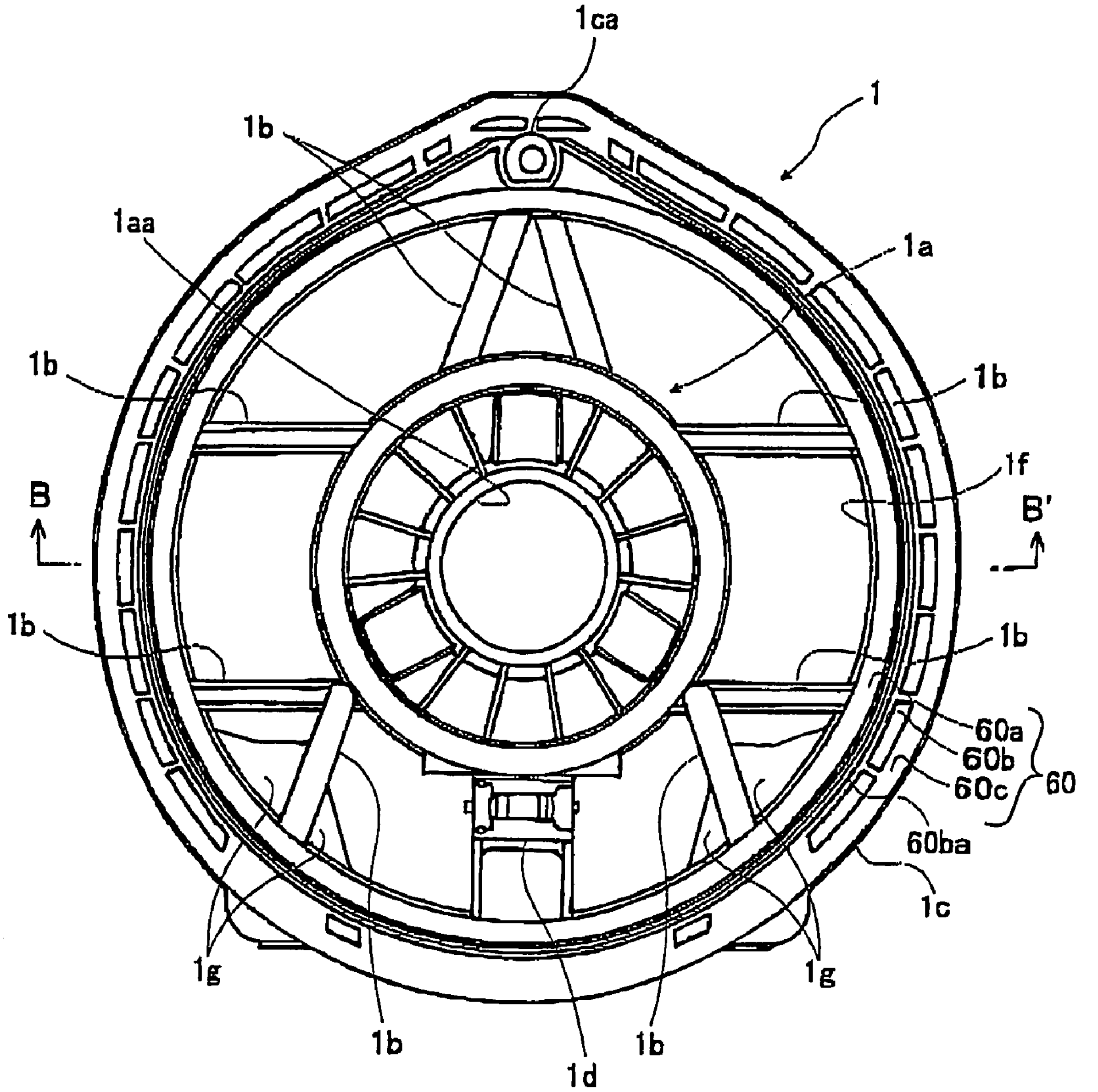
FIG. 6 shows a front view of a frame according to an embodiment of the present invention.
Figure 7:
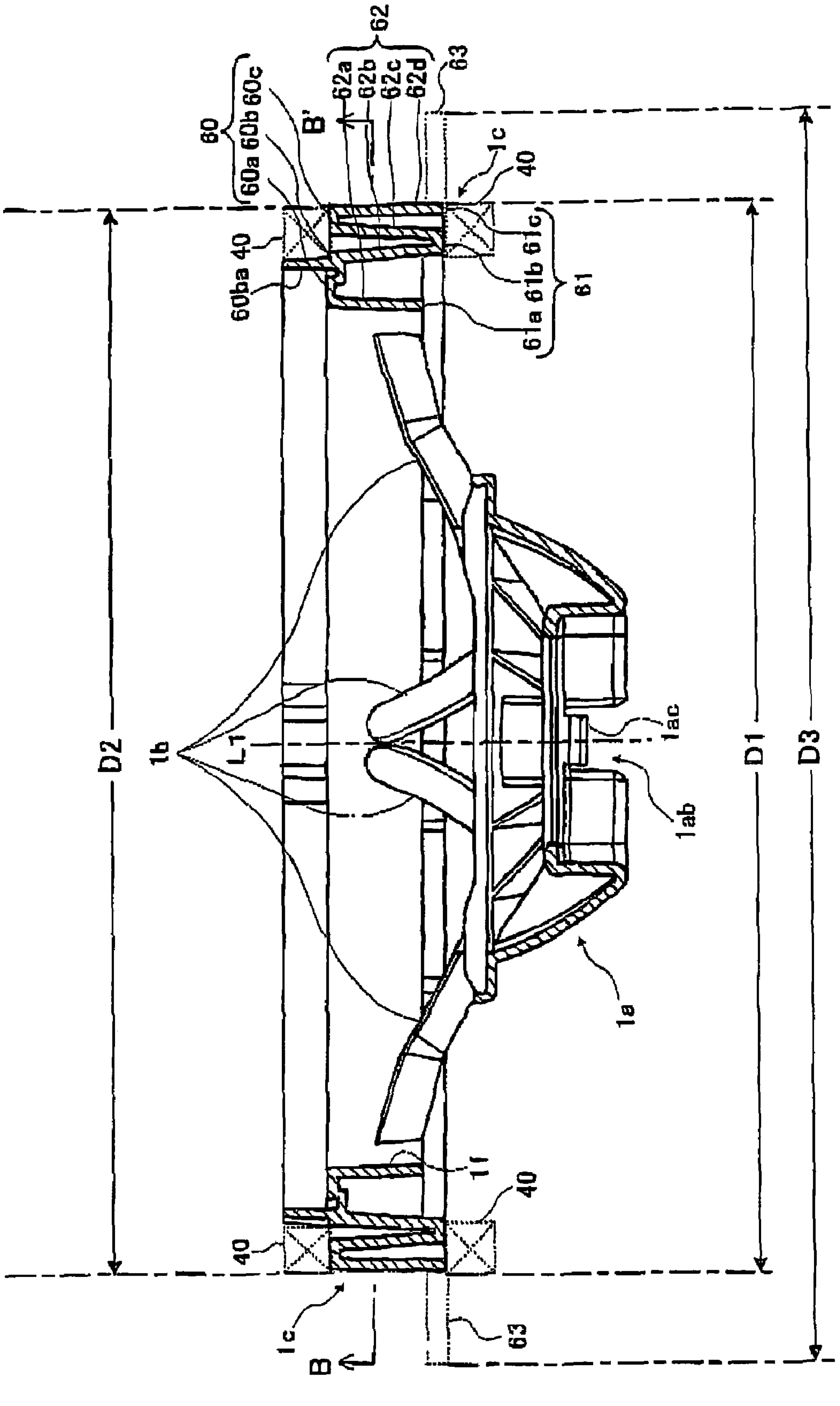
FIG. 7 shows a cross-sectional view of the frame along a cutting-plane line B-B' shown in FIG. 6.
Figure 8:
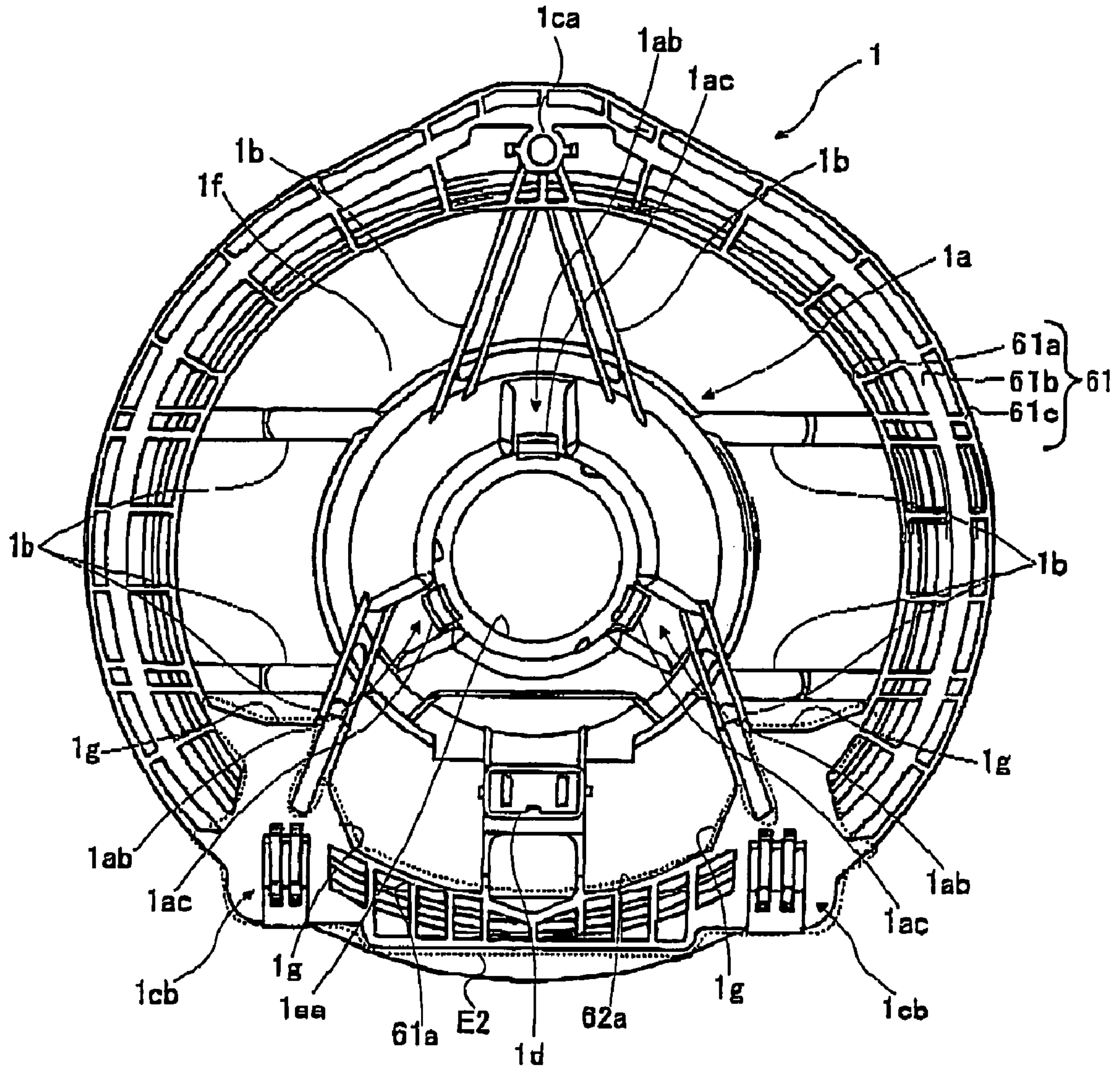
FIG. 8 shows a rear view of the frame according to the embodiment.
Figure 9:
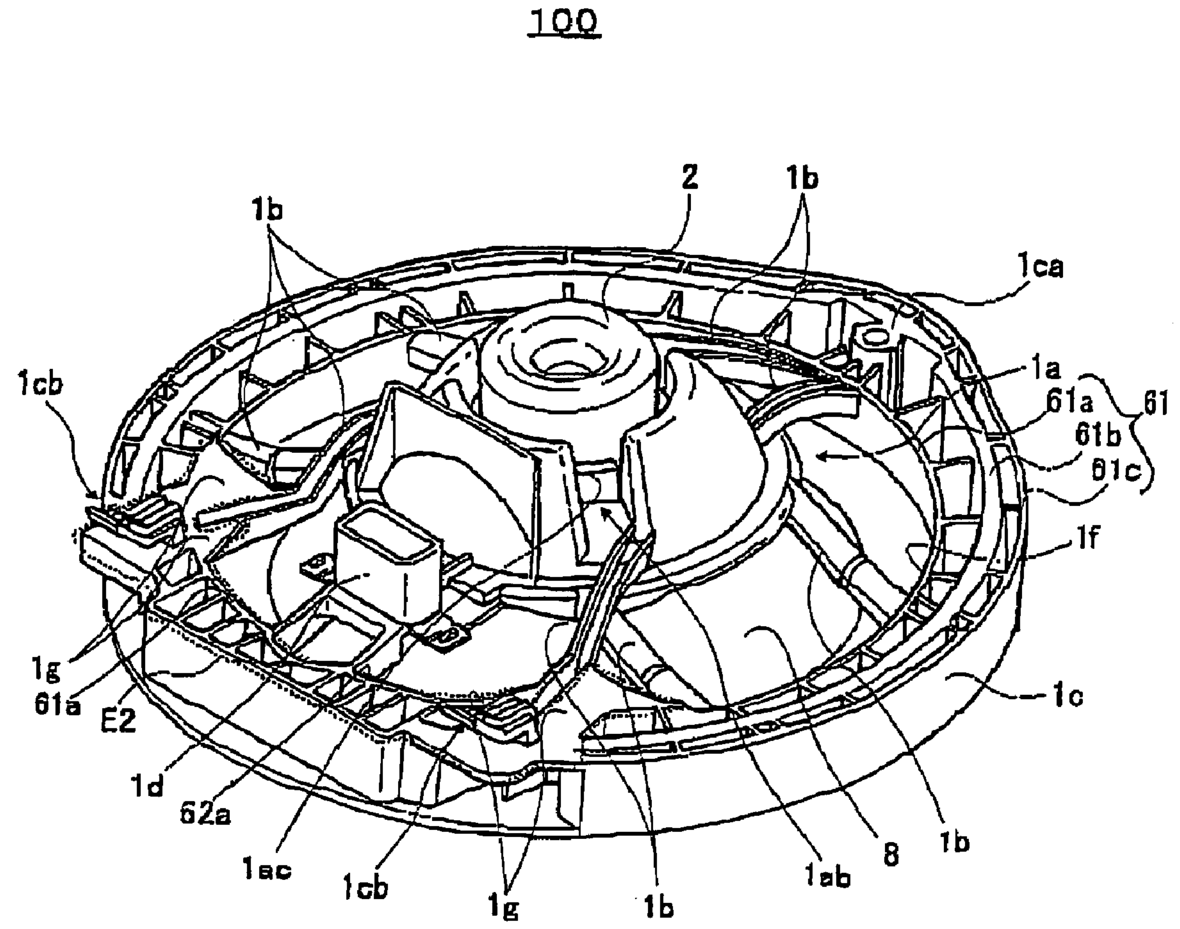
FIG. 9 is a perspective view of the speaker device corresponding to FIG. 2, and it is particularly a perspective view of the speaker device to which the frame having no cushion member is applied.

FIG. 6 shows a front view of the frame 1. FIG. 7 shows a cross-sectional view of the frame 1 taken along the cutting-plane line B-B' shown in FIG. 6. FIG. 7 also shows the cushion member 40 attached to the outer peripheral portion 1c. FIG. 8 shows a rear view of the frame 1. FIG. 9 is a perspective view of the speaker device 100 corresponding to FIG. 2, and it particularly shows a configuration of the frame 1 when observed from the rear side thereof. In FIG. 9, the cushion members 40 and 41 are not attached to the outer peripheral portion 1c so that the configuration of the lower surface of the outer peripheral portion 1c of the frame 1 is easily understood.

Since the basic configuration of the frame 1 is described above, the explanation thereof is omitted.

The outer peripheral portion 1c of the frame 1 includes an upper surface 60, a lower surface 61 and a connecting part 62 connecting the upper surface 60 and the lower surface 61, and each of the components is integrally formed. The configuration of the lower surface 61 of the outer peripheral portion 1c of the frame 1, which will be explained below, corresponds to the configuration of the portion of the lower surface of the outer peripheral portion 1c other than an area E2 in FIG. 8 and FIG. 9. The lower surface side of the outer peripheral portion 1c of the frame 1, corresponding to the area E2, and the lower surface side of the outer peripheral portion 1c other than the area E2 are mounted on the mounting base such as the inner panel of the vehicle door via the cushion member 40 and/or the cushion member 41.

The upper surface 60 is formed into a substantially annular shape and includes plural flat surfaces having flatness, i.e., a flat surface 60a, a flat surface 60b and a flat surface 60c. As shown in FIG. 7, the flat surface 60a is formed on the side of the inner peripheral wall of the outer peripheral portion 1c. The outer peripheral edge portion of the edge 9 is mounted on the flat surface 60a, which supports the edge 9. The flat surface 60b is formed on the outer side of the flat surface 60a. On a part of the flat surface 60b, an annular projecting part 60ba which projects on the upper side of the drawing and which is formed into an annular shape is formed. The annular projecting part 60ba has a function of positioning the cushion member 40 at an appropriate position of the upper surface 60 of the outer peripheral portion 1*c*. In a preferred example, height of the annular projecting part 60*ba* may be same as thickness of the cushion member 40. The flat surface 60*c* is formed on the outer side of the flat surface 60*b* with a constant space from the flat surface 60*b*. Namely, the flat surface 60*c* is formed on the side of the outer peripheral wall of the outer peripheral portion 1*c*. The flat surface 60*a*, the flat surface 60*b* and the flat surface 60*c* are arranged on the same surface. As shown in FIG. 7, the cushion member 40 (broken-line part) is attached onto the flat surface 60*b* and the flat surface 60*c* out of the plural flat surfaces.

On the other hand, the lower surface 61 is formed into a substantially annular shape and has plural surfaces having flatness, i.e., a flat surface 61*a*, a flat surface 61*b* and a flat surface 61*c*. As shown in FIG. 7, the flat surface 61*a* is formed on the side of the inner peripheral wall of the outer peripheral portion 1*c* and at a position overlapping with a part of the flat surface 60*a*. The flat surface 61*b* is formed on the outer side of the flat surface 61*a* with a constant surface from the flat surface 61*a*. The flat surface 61*c* is formed on the outer side of the flat surface 61*b* and at a position overlapping with a part of the flat surface 60*c* with a constant space from the flat surface 61*b*. The flat surface 61*b* and the flat surface 61*c* are on the same surface. The flat surface 61*a* is positioned at an upper position as compared with the flat surfaces 61*b* and 61*c*. Namely, there is a step between the flat surface 61*a* and the flat surfaces 61*b* and 61*c*. As shown in FIG. 7, the cushion member 40 (broken-line part) is attached to the flat surfaces 61*b* and 61*c* being the components of the lower surface 61.

The connecting part 62 is formed into an annular shape and has plural connecting parts, i.e., a connecting part 62*a*, a connecting part 62*b*, a connecting part 62*c* and a connecting part 62*d*. Each connecting part being the component of the connecting parts 62 is formed to extend in the direction perpendicular to the upper surface 60 and the lower surface 61.

As shown in FIG. 7, the connecting part 62*a* extends from the flat surface 61*a* being the component of the lower surface 61 to an end of the flat surface 60*a* being the component of the upper surface 60 to connect the flat surface 61*a* and the flat surface 60*a*. The inner peripheral wall of the connecting part 62*a* corresponds to the inner peripheral wall of the outer peripheral portion 1*c*. The connecting part 62*b* extends from an end of the flat surface 60*b* being the component of the upper surface 60 to an end of the flat surface 61*b* being the component of the lower surface 61 to connect the flat surface 60*b* and the flat surface 61*b*. The connecting part 62*c* extends from another end of the flat surface 61*b* being the component of the lower surface 61 to one end of the flat surface 60*c* being the component of the upper surface 60 to connect the flat surface 61*b* and the flat surface 60*c*. The connecting part 62*d* extends from another end of the flat surface 60*c* being the component of the upper surface 60 to the flat surface 61*c* being the component of the lower surface 61 to connect the flat surface 60*c* and the flat surface 61*c*. The outer peripheral wall of the connecting part 62*d* corresponds to the outer peripheral wall of the outer peripheral portion 1*c*.

As shown in FIG. 7, the cross-sectional shape of the outer peripheral portion 1*c* of the frame 1 having the above-mentioned configuration is formed into an accordion or bellows shape. In this embodiment, the flat surfaces 61*b* and 60*c* to which the cushion member 40 is attached are provided between the outer peripheral wall (connecting part 62*d*) of the outer peripheral portion 1*c* and the inner side of the outer peripheral wall of the outer peripheral portion 1*c*, i.e., the inner peripheral wall (connecting part 62*a*) of the outer peripheral portion 1*c*, not the outer side of the outer peripheral wall thereof, respectively. In this point, this invention is characterized. Thereby, as shown in FIG. 7, as for the frame 1 of this embodiment, the outer diameter on the side of the upper surface 60 of the outer peripheral portion 1*c*, i.e., an outer diameter D2 of the flat surface 60*c*, becomes same as the outer diameter on the side of the lower surface 61 of the outer peripheral portion 1*c*, i.e., an outer diameter D1 of the flat surface 61*c*. That is, in FIG. 7, the outer peripheral wall of the flat surface 60*c* being the component of the upper surface 60 and the outer peripheral wall of the flat surface 61*c* being the component of the lower surface 61 are positioned on the circumferential surfaces parallel with the central axis L1 of the frame 1, respectively.

In addition, as described above, at the outer peripheral portion 1*c* of the frame 1, one cushion member 40 formed into the stick shape is attached to the flat surfaces 60*b* and 60*c* out of the plural flat surfaces being the components of the upper surface 60, and another cushion member 40 is attached to the flat surface 61*b* and the flat surface 61*c* out of the plural flat surfaces being the components of the lower surface 61. FIG. 1 to FIG. 5 show such a state that the cushion members 40 formed into the stick shape are deformed into a substantial circle shape to be attached to each of the above-mentioned flat surfaces. In FIG. 1 to FIG. 5, the reference numerals of the respective components of the outer peripheral portion 1*c* are omitted for convenience of an explanation. Therefore, as for the positional relation between the cushion members 40 and each component of the outer peripheral portion 1*c*, FIG. 6 to FIG. 8 should be referred to.

As shown in FIG. 1 to FIG. 5 and FIG. 7, the inner peripheral wall of the cushion member 40 contacts the outer peripheral wall of the annular projecting part 60*ba* in such a state that the cushion member 40 is attached to the flat surfaces 60*b* and 60*c* being the components of the outer peripheral portion 1*c*. Namely, the annular projecting part 60*ba* functions to position the cushion member 40 at an appropriate position of the outer peripheral portion 1*c*.

In addition, the frame 1 of this embodiment has another characteristic in the configuration of the lower surface of the outer peripheral portion 1*c* corresponding to the area E2, other than the above-mentioned characteristics. Therefore, a description will be mainly given of the configuration of the lower surface of the outer peripheral portion 1*c* corresponding to the area E2 (the part surrounded by the broken line) with reference to FIG. 6, FIG. 8 and FIG. 9, below.

The lower surface (including the flat surface 61*a*) of the outer peripheral portion 1*c* of the frame 1 corresponding to the area E2 is formed to become flush with the flat surfaces 61*b* and 61*c* of the outer peripheral portion 1*c* corresponding to the area other than the area E2.

Particularly, in this embodiment, plural flat surfaces 1*g*, having paddle-shaped plane shapes and flush with the flat surface 61*a* corresponding to the area E2, are formed between the inner peripheral wall of the connecting part 62*a* corresponding to the area E2 and the plural arm parts 1*b* positioned in the vicinity of the respective mounting parts 1*cb*. In this embodiment, each of the flat surfaces 1*g* is formed into the paddle-shaped plane shape, i.e., a substantially triangle shape. However, the plane shape of the flat surface 1*g* is only one example. Namely, in this invention, the plane shape of the flat surface 1*g* can be formed into various kinds of known plane shapes such as a rectangular shape. As shown in FIG. 2 and FIG. 4, the cushion members 40 and 41 are attached onto the plural flat surfaces 1g. In this embodiment, the plural flat surfaces 1g are provided on the lower surface of the outer peripheral portion 1c corresponding to the area E2, and thereby the cushion member attachment surface is increased.

In this embodiment, the plural paddle-shaped flat surfaces 1g are formed between the arm part 1b positioned in the vicinity of the plural mounting parts 1cb and the inner peripheral wall of the connecting part 62a corresponding to the area E2. However, this invention is not limited to this. Namely, in this invention, the plural paddle-shaped flat surfaces 1g may be provided between all the arm parts 1b of the frame 1 and the correspondent inner peripheral wall of the connecting part 62a.

Next, a description will be given of advantageous operation and effect of the speaker device 100 according to the embodiment of the present invention, as compared with those of the comparative example.

First, a description will be given of the configuration of the outer peripheral portion of the frame according to the comparative example with reference to FIG. 7. In FIG. 7, none of the connecting parts 62b and 62c and the flat surface 61b is formed at the outer peripheral portion of the frame according to the comparative example. Instead, a flange part 63 (broken-line part) outwardly extending from the lower end portion of the outer peripheral wall of the connecting part 62d is formed, and the other configuration of the comparative example is substantially same as that of the embodiment. In the comparative example, the flange part 63 is formed at the outer peripheral portion of the frame in order to increase as many surfaces to which the cushion member is attached as possible. In the comparative example, the cushion member is attached onto the flat surfaces 60b and 60c being the components of the upper surface of the frame and the lower surface of the flange part 63, respectively. In the comparative example, by such a configuration, the outer diameter on the lower surface side of the frame, i.e., an outer diameter D3 of the flange part 63, becomes larger than the outer diameter on the upper surface side on the frame, i.e., the outer diameter D2(=D1) of the flat surface 60c.

Namely, in the comparative example, the flange part 63 is provided on the lower surface side of the outer peripheral portion 1c in order to increase the cushion member attachment surface. Thus, the outer diameter on the lower surface side of the frame becomes large by the amount, and the outer diameter of the entire frame 1 problematically becomes large.

On the other hand, since the shape of the outer peripheral portion 1c of the frame 1 is formed into the accordion-shaped or the concertina-shaped cross-sectional shape, the present invention does not include the problem included in the comparative example. Namely, in this embodiment, the flat surfaces 61b and 60c to which the cushion member 40 is attached are provided not on the outer side of the outer peripheral wall of the outer peripheral portion 1c, but on the inner side of the outer peripheral wall, i. e., between the inner peripheral wall (connecting part 62a) of the outer peripheral portion 1c and the outer peripheral wall (connecting part 62d) thereof, respectively. Thereby, as for the frame 1 of this embodiment, the outer diameter on the side of the upper surface 60 of the outer peripheral portion 1c, i.e., the outer diameter D2 of the flat surface 60c, becomes same as the outer diameter on the side of the lower surface 61 of the outer peripheral portion 1c, i.e., the outer diameter D1 of the flat surface 61c. Hence, according to this embodiment, the attachment surface of the cushion member 40 can be ensured without enlarging the outer measure of the frame 1.

Additionally, in the present invention, as shown in FIG. 6, FIG. 8 and FIG. 9, the plural flat surfaces 1g, having the paddle-shaped plane shapes and flush with the flat surface 61a corresponding to the area E2, are formed between the inner peripheral wall of the connecting part 62a corresponding to the area E2 (i. e., the inner peripheral wall of the outer peripheral portion 1c) and the plural arm parts 1b positioned in the vicinity of the respective mounting parts 1cb. That is, in the present invention, the plural flat surfaces 1g to which the cushion members 40 and 41 are attached are formed on the inner side with respect to the inner peripheral wall of the outer peripheral portion 1c of the frame 1 (i.e., on the side of the central axis L1 of the frame 1), and on the side of the opening 1f of the frame 1 on which the mounting base is positioned.

Thereby, in the present invention, the attachment surface to which the cushion member 40 is attached can be ensured on the lower surface of the outer peripheral portion 1c without enlarging the outer diameter of the frame 1, i.e., the outer diameter of the outer peripheral portion 1c of the frame 1. Hence, in the present invention, the outer diameter measure of the frame 1 can be diminished as compared with the above-mentioned comparative example.

Additionally, in the present invention, the plural flat surfaces 1g are provided at the above-mentioned positions. Thereby, it becomes possible to enhance the connecting strength between the frame 1 and each of the arm parts 1b positioned in the vicinity of each of the mounting parts 1cb. Further, it also becomes possible to enhance the connecting strength between the plural flat surfaces 1g and the frame 1.

What is claimed is:

1. A frame for a speaker device comprising:

an outer peripheral portion formed into an annular shape and having an outer peripheral wall; and a mounting part for mounting the frame on a mounting base, wherein the outer peripheral portion has one flat surface which is formed on one surface of the outer peripheral portion and to which a cushion member is attached, an additional flat surface which is formed on an additional surface of the outer peripheral portion and to which a cushion member is attached, and a connecting part which connects one end of the one flat surface and one end of the additional flat surface, wherein the one flat surface and the additional flat surface are radially inward of the outer peripheral wall, wherein the outer peripheral portion comprises an end surface that overlaps a part of the additional flat surface and that is radially inward of the one flat surface and flush with the one flat surface and that has flatness, wherein an annular projecting part projects from the end surface, wherein at least one of the one flat surface and the additional flat surface comprises a cushion member attachment surface that is radially inward of the outer peripheral wall and to which the cushion member is attachable, and wherein the mounting part is radially inward of the cushion member attachment surface.

2. The frame for the speaker device according to claim 1, wherein the outer peripheral portion has an inner peripheral wall on an inner side of the connecting part, and wherein the one flat surface and the additional flat surface are formed between the inner peripheral wall and the outer peripheral wall.

3. The frame for the speaker device according to claim 1, wherein the one surface of the outer peripheral portion corresponds to an upper surface of the outer peripheral portion and the additional surface of the outer peripheral portion corresponds to an lower surface of the outer peripheral portion, wherein the outer peripheral portion includes an additional connecting part connecting another end of the one flat surface and extending in a substantially same direction as the connecting part, and wherein the additional connecting part corresponds to the outer peripheral wall of the outer peripheral portion and an lower end of the additional connecting part becomes flush with the additional flat surface.

4. The frame for the speaker device according to claim 1, wherein the cushion member is attached to the cushion member attachment surface.

5. The frame for the speaker device according to claim 1, further comprising:

a magnetic circuit housing unit which is arranged on an inner side of the outer peripheral portion and houses a magnetic circuit; and plural arm parts which connect the magnetic circuit housing unit and the inner peripheral wall of the outer peripheral portion, wherein the cushion member attachment surface is formed on the additional surface of the outer peripheral portion and between the inner peripheral wall of the outer peripheral portion and the plural arm parts, and is flush with the additional flat surface.

6. The frame for the speaker device according to claim 1, wherein the cushion member attachment surface is formed into a paddle-shaped or triangle-shaped plane shape when planarly observed.

7. The frame for the speaker device according to claim 1, wherein said annular projecting part is radially inward of the cushion member attachment surface.

8. The frame for the speaker device according to claim 4, wherein said annular projecting part is radially inward of the cushion member attachment surface and said cushion member directly abuts said annular projecting part.

9. The frame for the speaker device according to claim 1, wherein the mounting part is radially inward of the connecting part.

* * * * *